A. L. BLALOCK.
DIFFERENTIAL.
APPLICATION FILED AUG. 30, 1916.
1,248,442.
Patented Dec. 4, 1917.
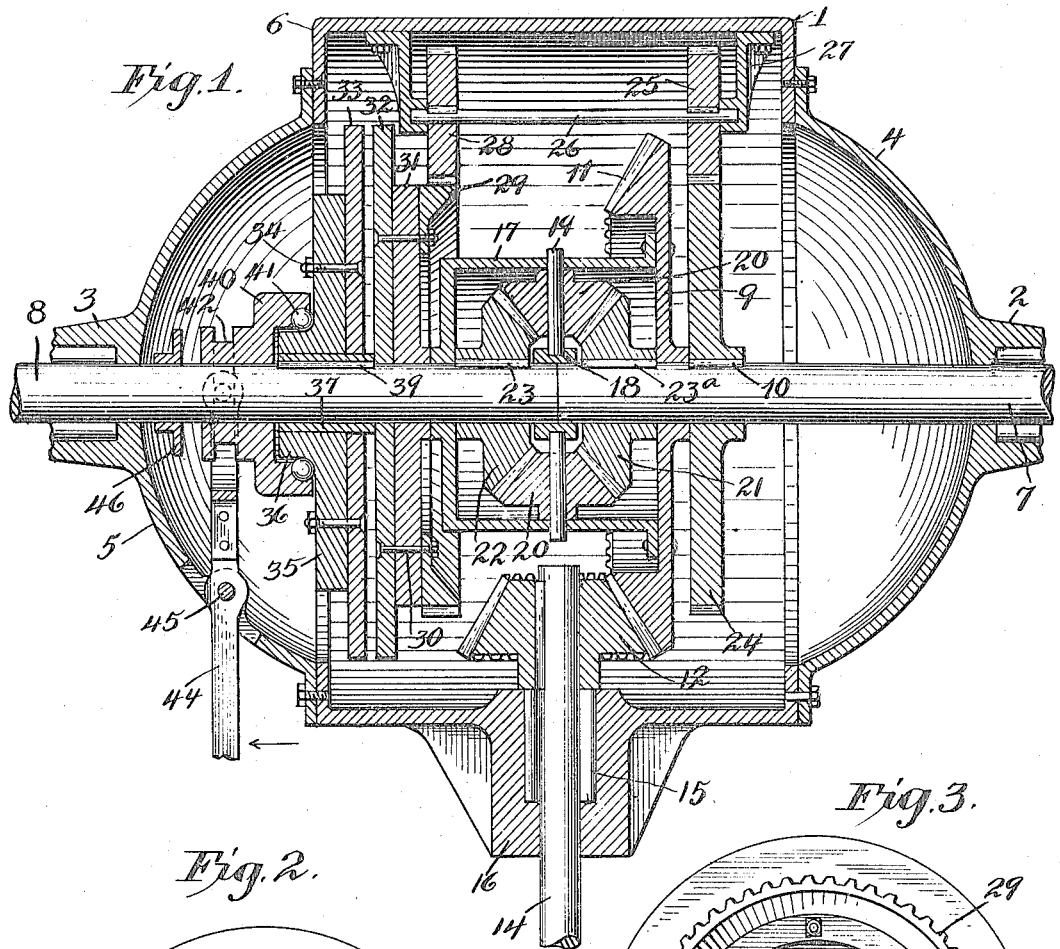
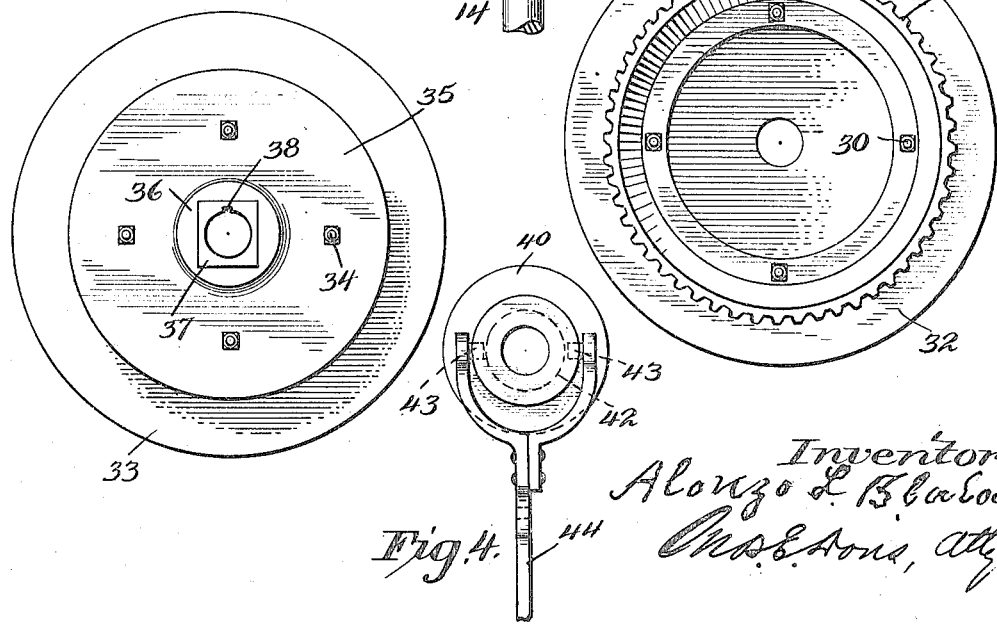
Inventor:
Alonzo L. Blalock

UNITED STATES PATENT OFFICE.

ALONZO L. BLALOCK, OF MADISON, FLORIDA.

DIFFERENTIAL.

1,248,442.

Specification of Letters Patent.

Patented Dec. 4, 1917.

Application filed August 30, 1916. Serial No. 117,785.

*To all whom it may concern:*

Be it known that I, ALONZO L. BLALOCK, a citizen of the United States, residing at Madison, in the county of Madison and State of Florida, have invented a new and useful Differential, of which the following is a specification.

It is the object of this invention to provide a means whereby both parts of the axle may be coupled up, at the will of an operator, to rotate at the same speed, the object in view being to prevent skidding and also to avoid a stalling of the vehicle, as takes place where one wheel of the vehicle rotates independently of the other, due to the ordinary construction of the differential.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in horizontal section, a device constructed in accordance with the present invention, parts appearing in elevation;

Fig. 2 is an elevation showing one of the pressure members;

Fig. 3 is an elevation showing another of the pressure members;

Fig. 4 is an elevation showing a portion of the shifting mechanism whereby the member delineated in Fig. 2 is operated.

The numeral 1 denotes generally, a casing, comprising an axle housing 2 and an axle housing 3, the housing 2 merging into a cap 4, and the housing 3 merging into a cap 5. The caps 4 and 5 are secured to opposite sides of a drum 6. An axle 7 is journaled in the housing 2 and an axle 8 is journaled in the housing 3. A disk 9 is shown, and the axle 7 is rotatable therein. The disk 9 has a beveled gear 11 meshing into a beveled pinion 12 secured to a drive shaft 14 journaled anti-frictionally as shown at 15 in a bearing boss 16, constituting a part of the drum 6. A gear case 17 is secured to the disk 9. Located within the gear case 17 is a collar 18 in which the inner ends of the axles 7 and 8 are journaled. Shafts 19 are carried by the collar 18 and by the gear case 17. Beveled pinions 20 are supported for rotation by the shafts 19. The beveled pinions 20 mesh into a beveled gear 21 held to the axle 7, to rotate therewith, by means of a key 23ª. The beveled pinions 20 mesh also into a beveled gear 22 held by a key 23 to the axle 8.

Mounted on the axle 7 is a gear wheel 24 held to rotate with the axle by means of a key 10. The gear wheel 24 meshes into a pinion 25 secured to a shaft 26 journaled in bearings 27 carried by the drum 6. A pinion 28 is secured to the shaft 26 and meshes into a gear ring 29 attached at 30 to a disk 31 journaled for rotation on the axle 8. The securing elements 30 which attach the gear ring 29 to the disk 31, attach also to the disk 31, a disk 32, which is adapted to rotate on the axle 8, like the disk 31.

A disk 33 is mounted on the axle 8 to rotate therewith and to slide therealong toward and away from the disk 32. The disk 33 is secured at 34 to a backing disk 35 having a hub 36. Mounted in the disks 33 and 35 and held therein against rotation is a bushing 37 provided with a groove 38 receiving a spline 39 on the axle 8, the disks 33 and 35 thus being connected with the axle 8 to move longitudinally thereof, and to rotate with the axle. A collar 40 surrounds the axle 8 and the axle rotates in the collar. Anti-friction balls 41 are interposed between the collar 40 and the disk 35, the balls being located about the hub 36 of the said disk. Any suitable means may be provided for moving the collar 40 longitudinally of the axle 8. In the present embodiment of the invention, but not necessarily, the collar 40 is provided with a groove 42 receiving projections 43 on the forks of a lever 44 fulcrumed at 45 on the cap 5. The position of the lever 44 may be changed from that shown in the drawings, without jeopardizing the utility of the invention. Mounted on the axle 8 is a stop 46 with which the collar 40 coacts when the collar is retracted.

The shaft 14 drives the beveled pinion 12, the latter actuating the beveled gear 11. The disk 9, the case 17, the shafts 19 the pinions 20 and the beveled gears 22 and 21 rotate the axles 8 and 7, and each of the axles 7 and 8 has the usual movement independently of the other, as is common in a differential, when one wheel runs faster than the other.

When the lever 44 is swung in the direction of the arrow in Fig. 1, the collar 40, acting through the balls 41 pushes over the disk 35 and consequently the disk 33, until the disk 33 bears against the disk 32. The effect thus produced is transmitted to the disk 31, the gear ring 29, the pinion 28, the shaft 26, the pinion 25, the gear wheel 24, and thence into the axle 7.

From the foregoing it will be clearly understood that a simple but efficient means is provided whereby the axles 7 and 8 may be coupled together to rotate at the same speed, the driving power being delivered from the shaft 14. One wheel then cannot rotate independently of the other, skidding will be avoided and the vehicle will not be likely to become stalled, since power can be applied to both wheels at once.

Having thus described the invention, what is claimed is:—

1. In a device of the class described, a casing; axles journaled therein; a differential drive connecting the axles; mechanism within the casing and permanently connected to one axle for coupling the axles for rotation in unison, said mechanism being independent of the differential drive and external thereto; and means under the control of an operator for coupling said mechanism to the other axle.

2. In a device of the class described, a casing; axles journaled therein; a differential drive connecting the axles; a gear wheel fixed to one axle; a gear wheel rotatable on the other axle; a shaft journaled in the casing; pinions fixed to the shaft and meshing into the respective gear wheels; and means under the control of an operator for coupling the rotatable gear wheel to said other axle.

3 The combination with a pair of axles and a differential drive connecting the axles, of a gear train disposed externally of the differential drive and including a first terminal member fixed to one axle, and a second terminal member loose upon the other axle, and means for coupling the second terminal member to said other axle.

ALONZO L. BLALOCK.

Attest:
R. B. FERGUSON,
P. H. NUGENT.